(12) United States Patent
Nettleton et al.

(10) Patent No.: US 7,039,087 B2
(45) Date of Patent: May 2, 2006

(54) END PUMPED SLAB LASER CAVITY

(75) Inventors: John E. Nettleton, Fairfax Station, VA (US); Dallas N. Barr, Woodbridge, VA (US); Charlie W. Trussell, Woodbridge, VA (US)

(73) Assignee: The United States of America as represented by the Department of the Army, Washington, DC (US)

( * ) Notice: Subject to any disclaimer, the term of this patent is extended or adjusted under 35 U.S.C. 154(b) by 27 days.

(21) Appl. No.: 10/844,446

(22) Filed: May 13, 2004

(65) Prior Publication Data

US 2005/0254540 A1    Nov. 17, 2005

(51) Int. Cl.
*H01S 3/091* (2006.01)
*H01S 3/092* (2006.01)
*H01S 3/081* (2006.01)

(52) U.S. Cl. ............................. 372/71; 372/10; 372/93
(58) Field of Classification Search ............... 372/21, 372/22, 27, 70, 71, 92–94, 97, 10, 93
See application file for complete search history.

(56) References Cited

U.S. PATENT DOCUMENTS

| | | | | |
|---|---|---|---|---|
| 4,955,034 A | * | 9/1990 | Scerbak | 372/94 |
| 5,181,211 A | * | 1/1993 | Burnham et al. | 372/21 |
| 5,291,503 A | * | 3/1994 | Geiger et al. | 372/21 |
| 5,675,594 A | * | 10/1997 | Hovis et al. | 372/22 |
| 5,687,186 A | * | 11/1997 | Stultz | 372/92 |
| 6,373,865 B1 | * | 4/2002 | Nettleton et al. | 372/10 |
| 6,556,339 B1 | * | 4/2003 | Smith et al. | 359/334 |
| 6,671,305 B1 | * | 12/2003 | Knights et al. | 372/92 |
| 6,914,928 B1 | * | 7/2005 | Trussell, Jr. | 372/71 |

* cited by examiner

*Primary Examiner*—Wilson Lee
*Assistant Examiner*—Leith A. Al-Nazer
(74) *Attorney, Agent, or Firm*—William H. Anderson

(57) ABSTRACT

The End Pumped Slab Laser Cavity incorporates all optical components required for a short-pulse laser. These optical components are 'locked' into alignment forming an optical laser cavity for diode laser or flash lamp pumping. The optical laser cavity never needs optical alignment after it is fabricated. The cavity is configured for optimal absorbtion for diode laser end-pumping over broad temperature ranges.

18 Claims, 2 Drawing Sheets

END PUMPED SLAB LASER CAVITY

GOVERNMENT INTEREST

The invention described herein may be manufactured, used, sold, imported, and/or licensed by or for the Government of the United States of America.

FIELD OF INTEREST

This invention relates to laser range finders and laser designators.

BACKGROUND OF THE INVENTION

Laser range finders and laser designators are becoming an increasingly vital component in high precision targeting engagements. The precise and accurate range to target information is an essential variable to the fire control equation of all future soldier weapons. This information is easily, and timely, provided by laser range finders. The laser designator operator surgically selects a target by placing the high-energy laser beam onto the target.

Unfortunately, current fielded laser systems are bulky, heavy and expensive. These laser systems were developed with twenty year old laser technology.

SUMMARY OF THE INVENTION

Accordingly, one object of the present invention is to provide an end pumped slab laser cavity for a laser range finder and laser designator that minimizes the size, weight, performance and production costs of the laser range finder and laser designator. To meet this object, a laser diode pump produces laser outputs into an Nd:YAG folded cavity. The output from Nd:YAG folded cavity 101 passes through a passive/active Q-switch 102 and then, through an optical parametric oscillator 103. The components of this laser range finder or laser designator are optically fused together into a single block. The end result is an eye safe 1.5 µ output for laser designation or range finding.

This invention proposes a new concept, the End Pumped Slab Laser Cavity, which makes the development/fabrication of a very compact laser range finder or designator feasible.

BRIEF DESCRIPTION OF THE DRAWINGS

These and other objects of the invention will become readily apparent in light of the Detailed Description Of The Invention and the attached drawings wherein.

DETAILED DESCRIPTION OF THE INVENTION

Figure 1:
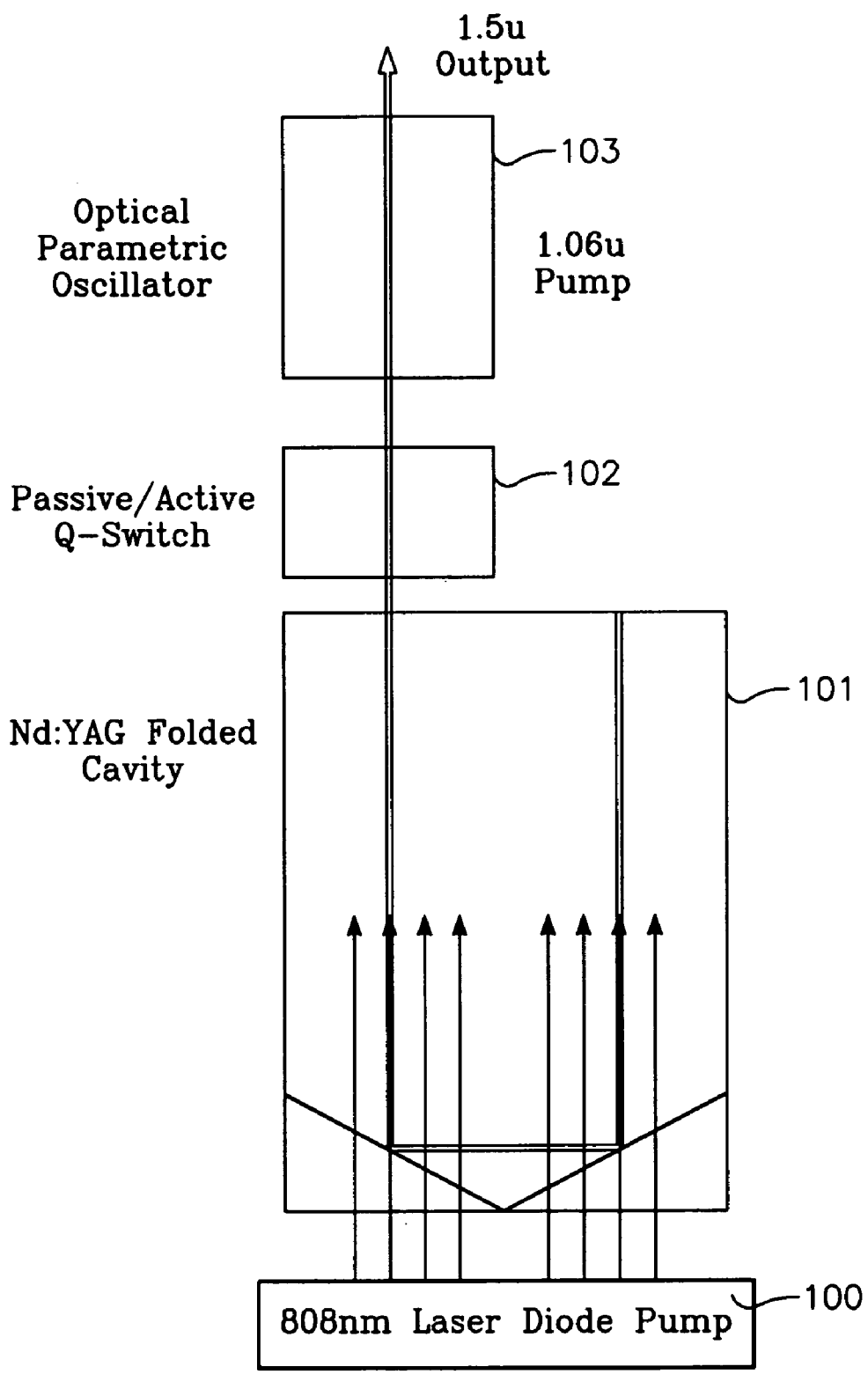
FIG. 1 is a block diagram of the present invention having an end-pumped Nd:YAG—OPO micro-slab design.

The present invention includes several optical components fused into one 'block' or pseudo-monolithic laser cavity. It is termed "pseudo-monolithic" since many components are incorporated into the structure. The proposed invention is named 'End Pumped Slab' because of its design is intended for laser diode pumping from the end, even though for higher energy diode pumping from the sides is possible. FIG. 1 depicts the components of the End Pumped Slab Laser Cavity. As shown in FIG. 1 a laser diode pump 100 produces laser outputs to an Nd:YAG folded cavity 101. The output from Nd:YAG folded cavity 101 passes through a passive/active Q-switch 102 and then, through an optical parametric oscillator 103. The end result is an eye safe 1.5 µ output.

The optical components described above are bonded (diffusion or optical epoxy) to form one optical 'block'. All components are pre-aligned during the crystal manufacturing process to form the optical laser cavity. The polarization coating at one of the turn angles is required only if linearly polarized output is required for pumping an external optical parametric oscillator (OPO) cavity 103 (e.g. to the 1.5 micron eye safe wavelength) or if an active, polarization dependent, Q-switch is used for precise timing of the laser output pulse. This polarization is essential for effective OPO conversion and active Q-switch 102 operation. The active material is Nd:YAG. The Q-switch 102 can be an optical passive device made from chromium YAG if critical pulse firing timing is not required. This component can also be coated with the proper optical layers for the laser cavity's output coupler.

All the optical components previously described have been fabricated in YAG-base materials. This is not necessary but desired in that the End Pumped Slab Laser Cavity has a uniform coefficient of thermal expansion and the Nd:YAG material is relatively inexpensive and available. This leads to robust/dependable operation over the wide range of thermal conditions the laser must operate. Other materials may be used in the End Pumped Slab Laser Cavity if conditions allow. For example, Nd:YVO4, Nd:YLF, Nd:YAP, etc. are all candidate materials that may be used in End Pumped Slab laser cavity configuration of the present invention.

Figure 2:
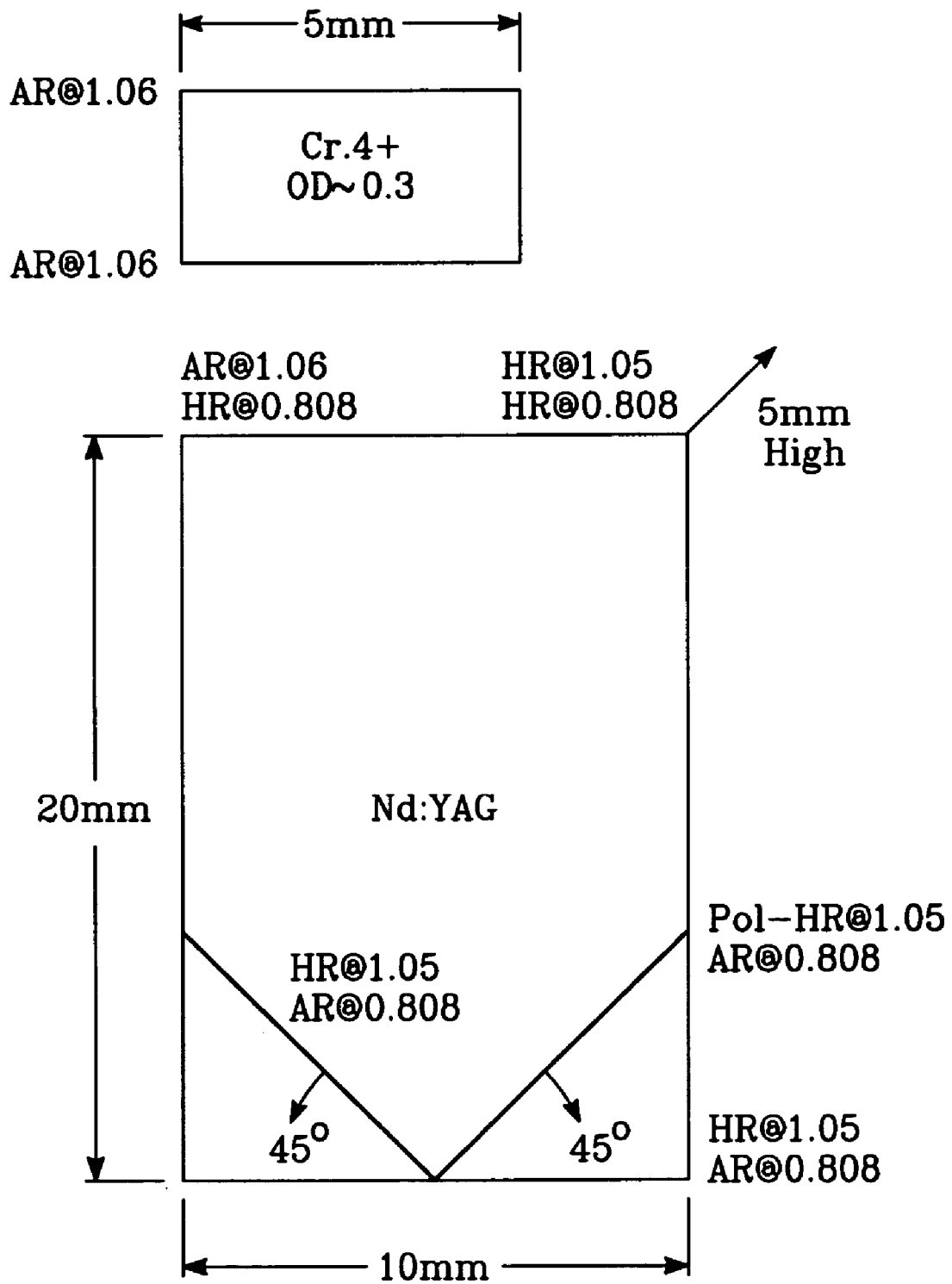
FIG. 2 is a block diagram of the present invention giving more details of the end-pumped Nd:YAG—OPO micro-slab design.

The present invention simplifies the producibility of a laser range finder system. The fabrication of the End Pumped Slab Laser Cavity can be done using batch processing. Large rectangular, pre-coated optical components can be joined together, optically aligned to form the laser cavity and then sliced to produce modules. This batch process can greatly reduce the overall fabrication costs of the End Pumped Slab Laser Cavity module. The End Pumped Slab module is ultra-compact. Its overall size is approximately 15 mm (L)×10 mm (W)×5 mm (H) as depicted in FIG. 2. This extremely small size of a laser cavity allows for construction of a very compact, and lightweight, laser range finder. FIG. 2 also shows the High-Reflection Coating (HR), the Polarized High-Reflection Coating (Pol-HR), and the Anti-Reflection Coating (AR) specifications for one example of the present invention. A standard Nd:YAG Crystal has the following properties. Such crystals can be found from such companies as Casix™.

| 1. Basic Properties (1.0 atm % Nd doped) | |
|---|---|
| Chemical Formula | Nd: $Y_3Al_5O_{12}$ |
| Crystal Structure | Cubic |
| Lattice Constants | 12.01 Å |
| Concentration | ~1.2 × $10^{20}$ $cm^{-3}$ |
| Melting Point | 1970° C. |
| Density | 4.56 g/$cm^3$ |
| Mohs Hardness | 8.5 |
| Refractive Index | 1.82 |
| Thermal Expansion Coefficient | 7.8 × $10^{-6}$/K [111], 0–250° C. |
| Thermal Conductivity | 14 W/m /K @ 20° C., |
| | 10.5 W /m /K @ 100° C. |
| Lasing Wavelength | 1064 nm |

-continued

1. Basic Properties (1.0 atm % Nd doped)

| | |
|---|---|
| Stimulated Emission Cross Section | $2.8 \times 10^{-19}$ cm$^{-2}$ |
| Relaxation Time of Terminal Lasing Level | 30 ns |
| Radiative Lifetime | 550 μs |
| Spontaneous Fluorescence | 230 μs |
| Loss Coefficient | 0.003 cm$^{-1}$ @ 1064 nm |
| Effective Emission Cross Section | $2.8 \times 10^{-19}$ cm$^2$ |
| Pump Wavelength | 807.5 nm |
| Absorption band at pump wavelength | 1 nm |
| Linewidth | 0.6 nm |
| Polarized Emission | Unpolarized |
| Thermal Birefringence | High |

2. Standard Products specification

Dopant Concentration (atomic %): 0.9%~1.1%
Orientation: <111> crystalline direction ($_i$Å5$_i$ã)
Wavefront distortion: λ/8 per inch,
measured by a double-pass interferometer @
633 nm
Extinction Ratio:

Rods with diameter from 3 mm to 6.35 mm and with length to 100 mm: > 30 dB
Rods with diameter from 7 mm to 10 mm and with length to 100 mm: > 28 dB
Dimension Tolerances Diameter: $_i$Å0.025 mm ($_i$Å0.001"), Length: $_i$Å0.5 mm ($_i$Å0.02")
Barrel Finish: 50 80 micro-inch (RMS), grooved rod barrel are also available
Ends Finish:

| | |
|---|---|
| Surface Figure: | <λ/10 @ 633 nm |
| Parallelism: | <10 arc seconds |
| Surface quality: | <5 arc minutes |
| Clear Aperture: | >10/5 Scratch / Digper MIL-O-1380A |
| Chamfer: | <0.1 mm @ 45$_i$ã |
| Clear Aperture: | extend over the entire faces to the chambered edges |

Anti-Reflection Coating:
Single layer MgF2 coating with high damage
threshold for high power laser
operation. Reflectivity R < 0.25% @ 1064 nm per surface.
Damage threshold
over 750 MW/cm2 @ 1064 nm, 10 ns and 10 HZ.
High-Reflection Coating:
Standard HR coating with R > 99.8% @ 1064 nm and
R < 5% @ 808 nm can
be performed. Other HR coatings, such as HR @ 1064/532 nm,
HR @ 946 nm,
HR 1319 nm and other wavelengths are also available.
Standard products in-stock:
The standard Nd: YAG laser rod has dimensions
of ?3 × 5 mm and ?4 × 50
mm with AR or HR- coating for Diode Pumped Solid State Lasers (DPSS)

Of course for the present invention, these standard performance specifications would have to be changed in accordance with the sample specifications given in FIG. 2. However, such crystals are available and may be adapted to accommodate the present invention.

The End Pumped Slab Laser Cavity is a module that requires none of the labor extensive alignment procedures as current laser range finders/designators. No optical holders have to be fabricated, no complex engineering is required to design the optical cavity, and no precise laser cavity alignment(s) are required. Therefore, production labor and material costs are greatly reduced.

The End Pumped Slab Laser Cavity is a modular component. The modularity lends to ease of design for different pump sources. It can be incorporated in a flash lamp pumped or laser diode pumped system. The energy of the pump source (e.g. drive electronics) can be tailored for the specific mission (e.g. long range vs. medium range performance) without forcing all of the systems to meet the high demand requirements of the few.

In particular, the cavity is configured for optimal absorption for diode laser pumping over broad temperature ranges. The End Pumped Slab cavity is designed to be pumped by laser diode arrays on either side of the "plate." The width of the cavity has been designed to absorb nearly all of the laser diode pump output.

The present invention may be used as the laser source in very compact laser range finders or laser designators. It can be coupled with an OPO cavity for generation of eye safe laser output for eye safe laser range finding. These laser range finders have both military and commercial applications. The compact design of the End Pumped Slab Laser Cavity also lends itself to placement in other laser-based portable/hand-held devices. These may be medical devices, industrial tools or scientific equipment that would benefit from the size/weight reduction, dependable performance, and low cost of the End Pumped Slab Laser Cavity.

What is claimed is:

1. An end pumped slab laser cavity comprising:
   a laser pump;
   a folded laser cavity made of a high gain material, wherein the folded laser cavity is a pentagon having a cap portion, the cap portion being optically coated with a highly reflective material;
   a passive/active Q-switch; and
   an optical parametric oscillator;
   wherein the laser pump, folded cavity, passive/active Q-switch and optical parametric oscillator are optically fused together in series into a single block; and
   wherein a laser pulse from the laser pump is pumped into the folded laser cavity such that the laser pulse is reflected from one side of an opposite end of the folded laser cavity, reflected from one side of the cap portion to another side of the cap portion, and reflected out a second side at the opposite end of the folded laser cavity.

2. The end pumped slab laser cavity of claim 1 wherein the folded laser cavity is folded at 45° angles.

3. The end pumped slab laser cavity of claim 2 wherein the folded laser cavity is fabricated from a Nd:YAG crystal.

4. The end pumped slab laser cavity of claim 1 wherein the laser pump pumps its laser output from the end of the folded laser cavity.

5. The end pumped slab laser cavity of claim 1 wherein the laser output is an eye safe output.

6. The end pumped slab laser cavity of claim 1 wherein the folded optical cavity has polarization coatings to create the folds and wherein the polarization coatings include only one at a turn angle if linear polarized output is desired.

7. The end pumped slab laser cavity of claim 1 wherein the passive/active Q-switch is made of chromium YAG.

8. The end pumped slab laser cavity of claim 1 wherein the folded laser cavity has a uniform coefficient of thermal expansion.

9. The end pumped slab laser cavity of claim 1 wherein the folded optical cavity is made of material selected from the group comprising Nd:YVO4, Nd:YLF, and Nd:YAP.

10. A method for producing a laser range finder comprising the steps of:
provproviding a laser pump, a folded cavity, a passive/active Q-switch, and an optical parametric oscillator, wherein the folded laser cavity is a pentagon having a cap portion, the cap portion being optically coated with a highly reflective material, the folded laser cavity being made of a high gain material and
optically fusing the laser pump, folded cavity, passive/active Q-switch and optical parametric oscillator together in series into a single block; and
pumping a laser pulse from the laser pump into the folded laser cavity such that the laser pulse is reflected from one side of an opposite end of the folded laser cavity, reflected from one side of the cap portion to another side of the cap portion, and reflected out a second side of the opposite end of the folded laser cavity.

11. The method for producing a laser range finder of claim 10 wherein the folded laser cavity is folded at 45° angles.

12. The method for producing a laser range finder of claim 11 wherein the folded laser cavity is fabricated from a Nd:YAG crystal.

13. The method for producing a laser range finder of claim 10 wherein the laser pump pumps its laser output from the end of the folded laser cavity.

14. The method for producing a laser range finder of claim 10 wherein the laser output is an eye safe output.

15. The method for producing a laser range finder of claim 10 wherein the folded laser cavity has polarization coatings to create the folds and wherein the polarization coatings include only one at a turn angle if linear polarized output is desired.

16. The method for producing a laser range finder of claim 10 wherein the passive/active Q-switch is made of chromium YAG.

17. The method for producing a laser range finder of claim 10 wherein the folded laser cavity has a uniform coefficient of thermal expansion.

18. The method for producing a laser range finder of claim 10 wherein the folded laser cavity is made of material selected from the group comprising Nd;YVO4, Nd:YLF, and Nd:YAP.

* * * * *